US006644956B2

United States Patent
Liao

(10) Patent No.: US 6,644,956 B2
(45) Date of Patent: Nov. 11, 2003

(54) INJECTION MOLDING MACHINE

(75) Inventor: Hsueh-Cheng Liao, Chang-Hua (TW)

(73) Assignee: Multiple Corporation, Nan-Tou (TW)

( * ) Notice: Subject to any disclaimer, the term of this patent is extended or adjusted under 35 U.S.C. 154(b) by 48 days.

(21) Appl. No.: 09/983,855

(22) Filed: Oct. 26, 2001

(65) Prior Publication Data

US 2003/0082267 A1 May 1, 2003

(51) Int. Cl.[7] .............................................. B29C 45/02
(52) U.S. Cl. ........................ 425/557; 425/559; 425/568
(58) Field of Search ................................. 425/542, 544, 425/557, 567, 568, 569, 566

(56) References Cited

U.S. PATENT DOCUMENTS 5,980,805 A * 11/1999 Ohmura et al. ............. 425/566

* cited by examiner

Primary Examiner—Tim Heitbrink
(74) Attorney, Agent, or Firm—Liniak, Berenato & White, LLC

(57) ABSTRACT

An injection molding machine includes an injection chamber unit with a horizontal channel, a vertical channel, and a transitioning passage interconnecting the horizontal and vertical channels. The transitioning passage has an innermost turning side and an opposite outermost turning side longer than the innermost turning side. The transitioning passage includes at least two turning corners of obtuse angle at the outermost turning side and adjacent to the horizontal channel and the vertical channel, respectively. The transitioning passage further includes a tapered passage section which tapers toward the vertical channel, and a wall part which partially Ago confines the tapered passage section at the outermost turning side. The wall part has a shape conforming to a segment of a truncated cone-shaped face which extends angularly by an angle of less than 360 degrees.

3 Claims, 7 Drawing Sheets

INJECTION MOLDING MACHINE

BACKGROUND OF THE INVENTION

1. Field of the Invention

The present invention relates to an injection molding machine, more particularly to an injection molding machine having an injection chamber which is contoured to facilitate flow of liquid molding material therethrough.

2. Description of the Related Art

FIG. 1 illustrates a conventional injection molding machine which is shown to includes a machine body 1 mounted with an injection chamber unit 2, a screw barrel 4, mounted on the injection chamber unit 2, and an extruding screw 42 mounted inside the screw barrel 4. The injection chamber unit 2 is formed with a generally L-shaped injection chamber with a horizontal channel 21, a vertical channel 22 formed with an injection nozzle 221 at a bottom end thereof, an a transitioning passage 23 intercommunicating the horizontal channel 21 and the vertical channel 22. The screw barrel 4 is coupled to a drive mechanism, such as a hydraulic cylinder 43, and is driven by the hydraulic cylinder 43 to extend partially and movably into the horizontal channel 21 for reciprocating movement in the horizontal channel 21. As shown, when a liquid molding material flows from the horizontal channel 21 to the vertical channel 22, the route of the molding material turns almost at a right angle at the transitioning passage 23 so that the pressure and velocity of the material at the right angled part decrease to levels lower than the predetermined values thereof, thereby dramatically reducing the pressure of the material injected into the mold from the injection nozzle 221. In other words, the dead corner formed at the right angled part can generate a turbulent flow with considerable pressure drop, thereby accumulating the material at the right angled part and decreasing the efficiency of injection molding.

SUMMARY OF THE INVENTION

Therefore, the main object of the present invention is to provide an injection molding machine with an improved injection channel which can minimize or reduce the pressure drop occurring at a substantially right angled part thereof.

Accordingly, the injection molding machine of the present invention is used for injection molding a material, and includes a machine body, an injection chamber unit mounted on the machine body, a screw barrel mounted on the machine body and partially and movably extending into the injection chamber unit for reciprocating movement therein, and an extruding screw mounted inside the screw barrel. The injection chamber unit has a substantially horizontal channel for reciprocation of the screw barrel, a substantially vertical channel having an injection nozzle, and a transitioning passage interconnecting the horizontal channel and the vertical channel. The transitioning passage has an innermost turning side and an opposite outermost turning side longer than the innermost turning side. The transitioning passage includes at least two turning corners of obtuse angle at the outermost turning side. One of the turning corners is disposed at the juncture of the horizontal channel and the transitioning passage. The other one of the turning corners is disposed at the juncture of the transitioning passage and the vertical channel. The transitioning passage further includes an asymmetric tapered passage section which tapers toward the vertical channel and which has a wall part that partially confines the tapered passage section at the outermost turning side. The wall part has a shape conforming to a segment of a truncated cone-shaped face which extends angularly by an angle of less than 360 degrees.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
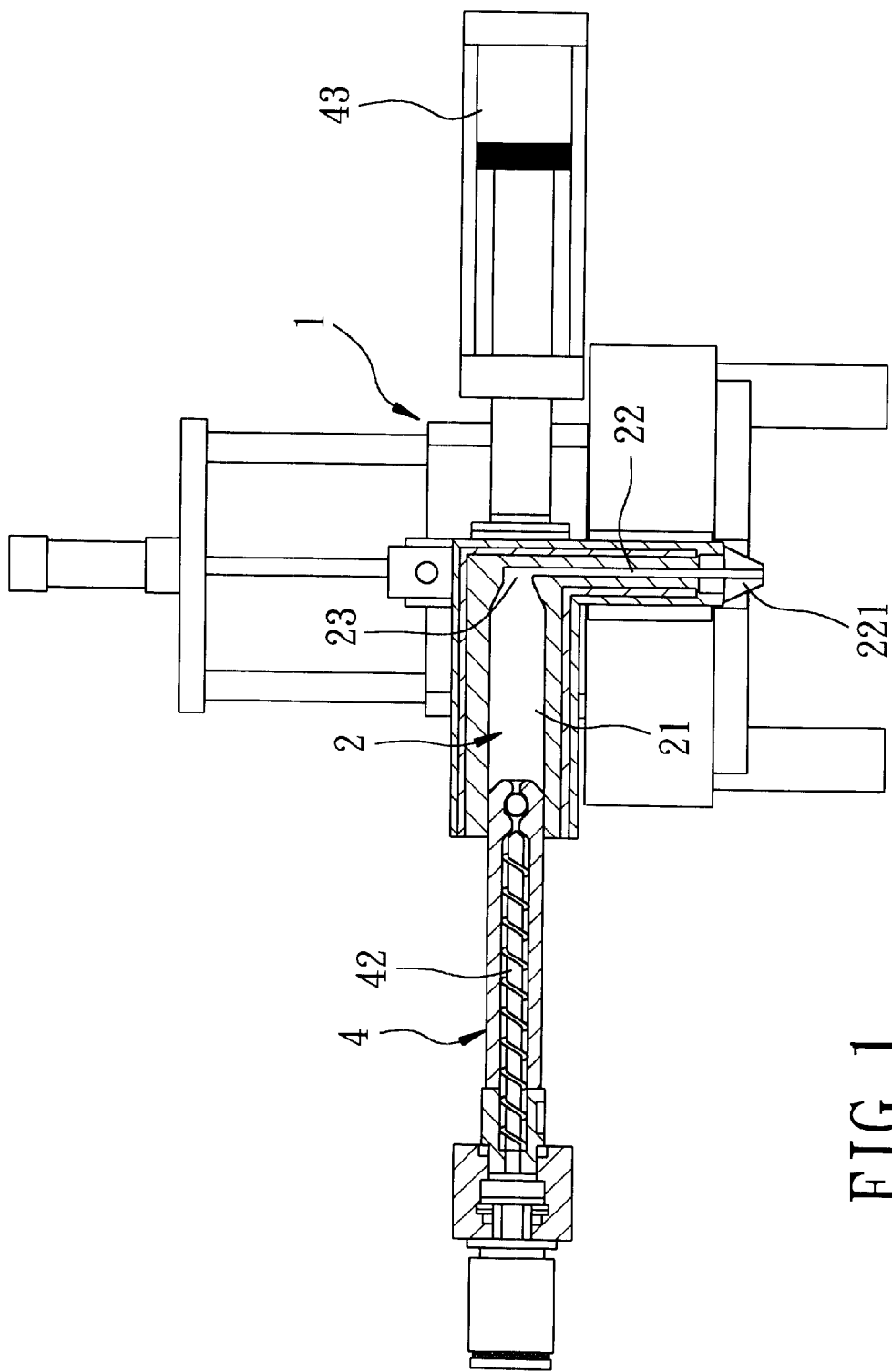
FIG. 1 is a partly-sectioned side view of a conventional injection molding machine.

Before the present invention is described in greater detail, it should be noted that like elements are denoted by the same reference numerals throughout the disclosure.

Figure 2:
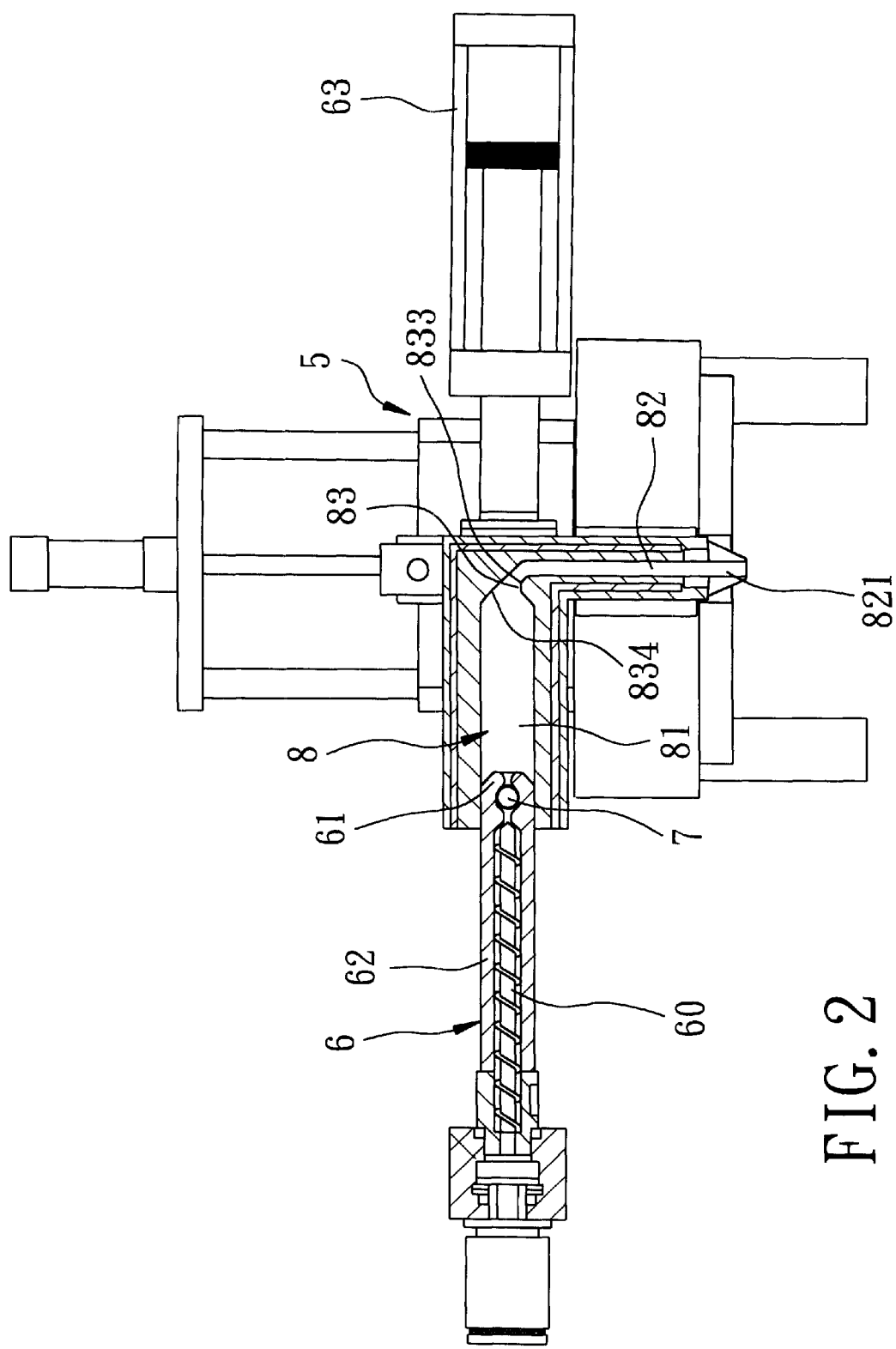
FIG. 2 is a partly-sectioned side view of a first preferred embodiment of the injection molding machine of the present invention.

Referring to FIG. 2, the first preferred embodiment of the injection molding machine of the present invention is shown to include a machine body 5, an injection chamber unit 8 mounted on the machine body 5, and a feeding device 6 which includes a screw barrel 62 mounted on the machine body 5 and an extruding screw 60 mounted inside the screw barrel 62. The feeding device 6 is operable for feeding liquid molding material into the injection unit 8. The injection chamber unit 8 has a substantially horizontal channel 81, a substantially vertical channel 82 formed with a nozzle 821 at its lower end, and a transitioning passage 83 interconnecting one end of the horizontal channel 81 and an upper end of the vertical channel 82. The screw barrel 62 is driven by a drive mechanism, such as a hydraulic cylinder 63, and extends partially and movably into the horizontal channel 81 for reciprocating movement in the horizontal channel 81. A non-return valve 7 is provided at a distal end ±1 of the screw barrel 62.

Figure 3:
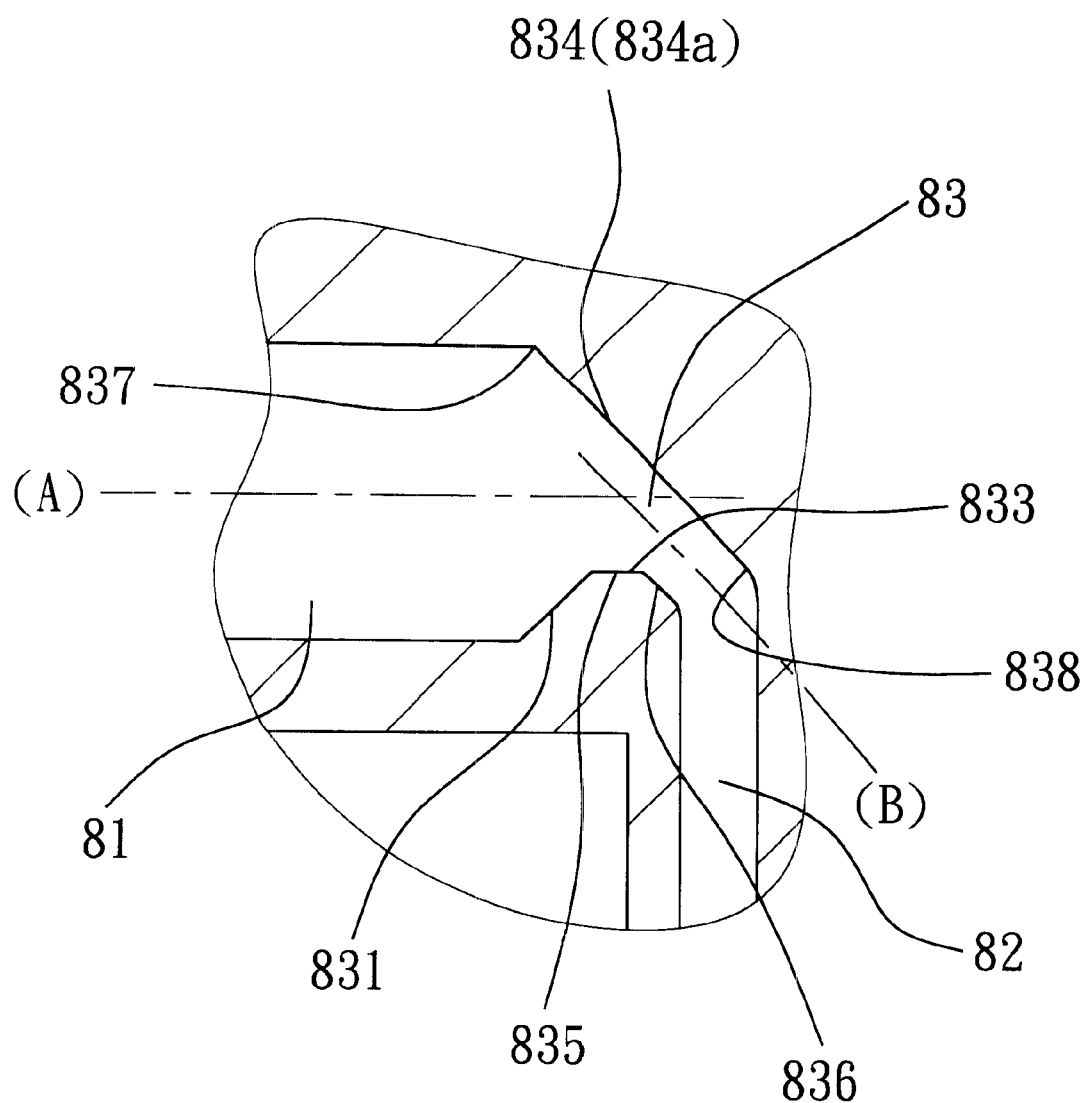
FIG. 3 is an enlarged fragmentary sectional view illustrating an injection chamber unit of the first preferred embodiment.
Figure 4:
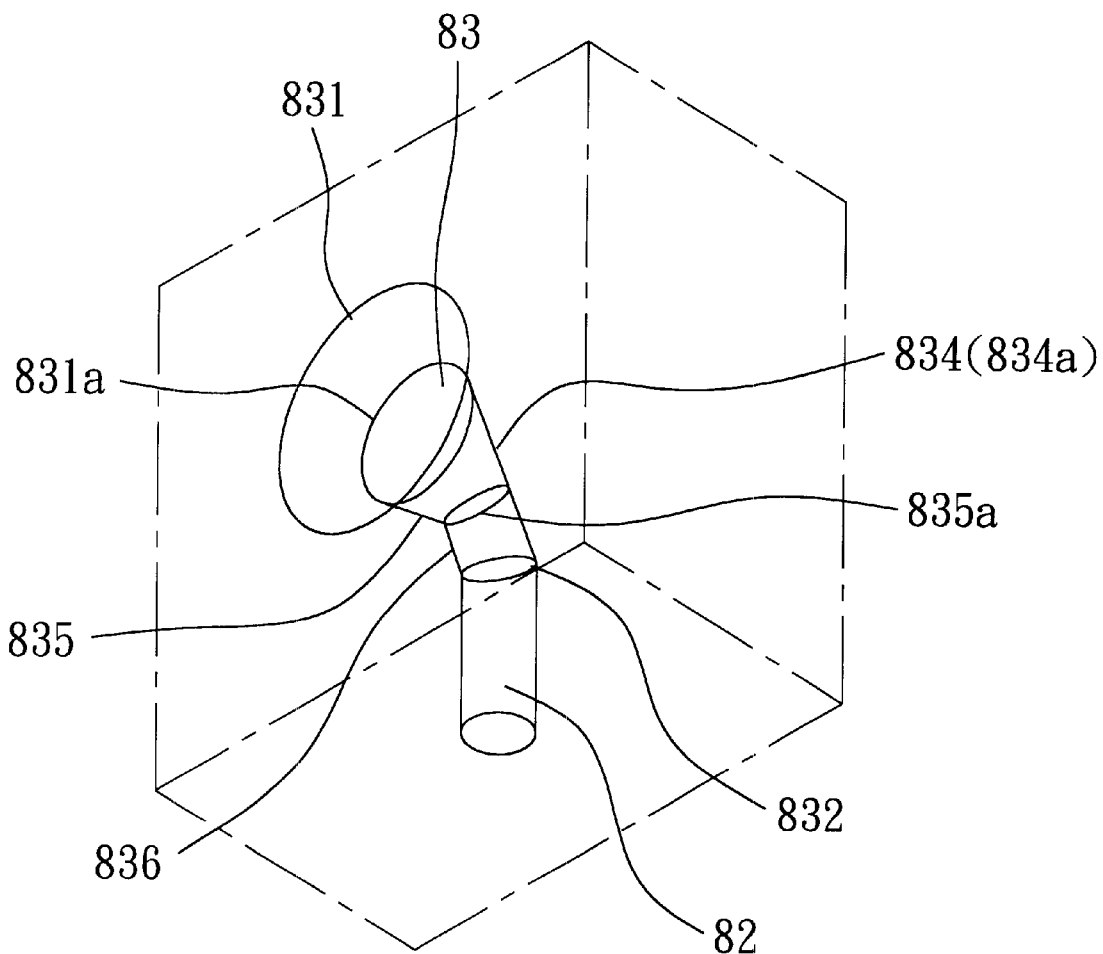
FIG. 4 is a fragmentary schematic perspective view illustrating the injection chamber unit of the injection molding machine of the first preferred embodiment.

Referring to FIGS. 2 and 3, the transitioning passage 83 has an innermost turning side 833 and an opposite outermost turning side 834 longer than the innermost turning side 833. The transitioning passage 83 has first and second turning corners 837, 838 of obtuse angle at the outermost turning side 834. The first turning corner 837 is disposed at the juncture of the horizontal channel 81 and the transitioning passage 83. The second turning corner 838 is disposed at the juncture of the transitioning passage and the vertical channel 82. The innermost turning side 833 is so contoured as to cooperate with the outermost turning side 834 to define a series of passage sections in the transitioning passage 83. In the transitioning passage 83, a first tapered passage section 831 of symmetric truncated cone-shape is connected to said one end of the horizontal channel 81 and has an axis (A) substantially co-axial with an axis of the horizontal channel 81. With further reference to FIG. 4, the first tapered passage section 831 has a first converging end 831a opposite to the horizontal channel 81. An asymmetric second tapered passage section 835 is connected to the first converging end 831a of the first tapered passage section 831. The second tapered passage section 835 tapers toward the vertical passage 82, and has a second converging end 835a opposite to the first tapered passage section 831. The first tapered passage section 831 has an outer wall part 834a which partially confines the first tapered passage section 831 and which has a shape conforming to a segment of a truncated cone-shaped face that extends angularly by an angle of less than 360 degrees. The outer wall part 834a complements with the remaining wall part of the first tapered passage section 831, which is shaped differently therefrom, so as to form an asymmetric tapered confining wall.

A substantially cylindrical connecting passage section 836 has one end connected to the second converging end 835a of the second tapered passage section 835 and another end 832 connected to the upper end of the vertical channel 82 to interconnect the second tapered passage section 835 and the vertical channel 82. The connecting passage section 836 has an axis (B) which is inclined relative to the axis of the horizontal channel 81 and to an axis of the vertical channel 82. The outer wall part 834a and the turning corners 837, 838 of obtuse angle facilitate flow of the liquid molding material into the vertical channel 82 via the transitioning passage 83. This reduces the friction and pressure drop occurring in the flow of the material and permits the material to flow into the vertical channel 82 at a predetermined rate. As a result, the material can be injected into a mold with sufficient pressure, and the rate of good quality products can be increased.

Figure 5:
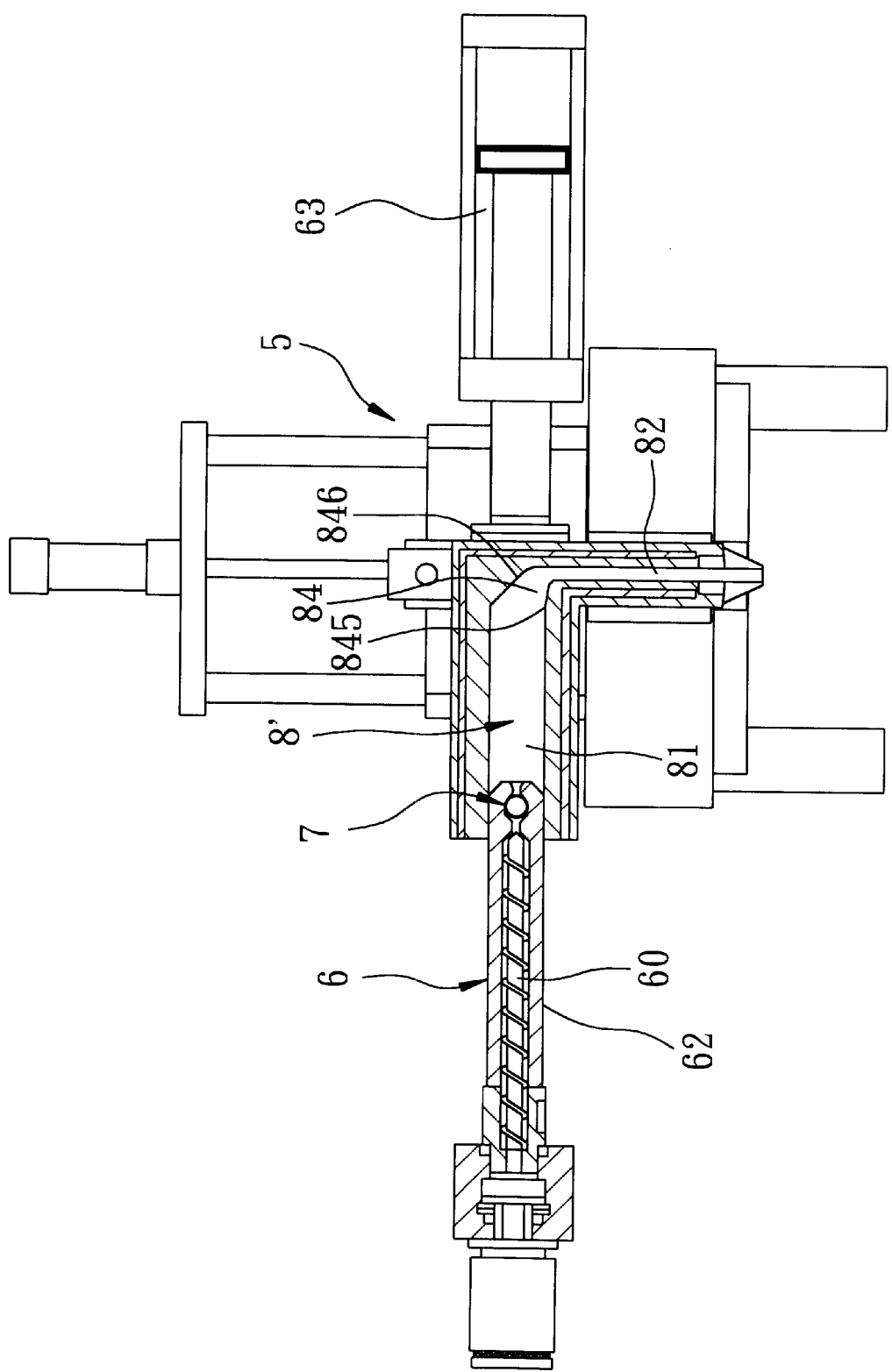
FIG. 5 is a partly-sectioned side view of a second preferred embodiment of the injection molding machine of the present invention.
Figure 6:
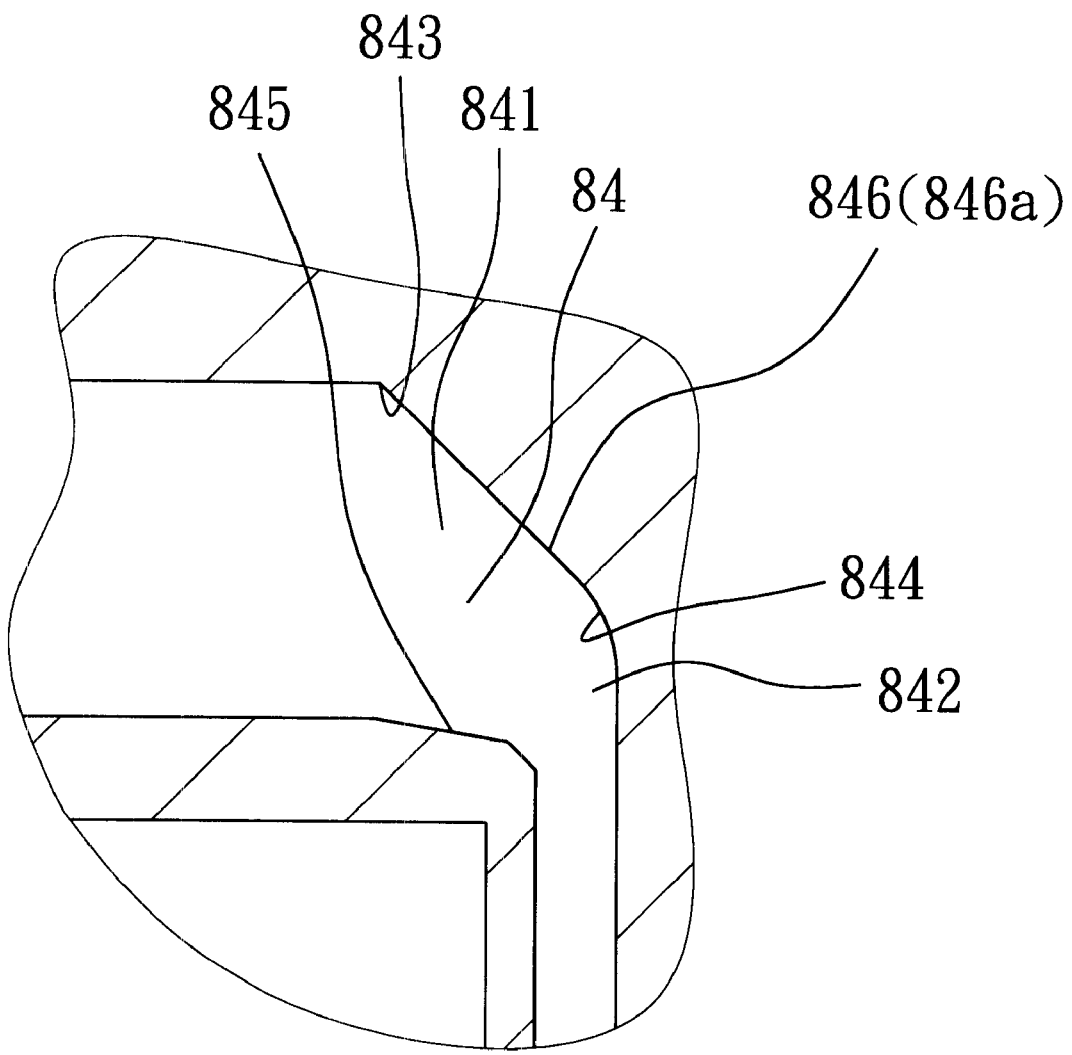
FIG. 6 is an enlarged fragmentary sectional view illustrating an injection chamber unit of the injection molding machine of the second preferred embodiment.
Figure 7:
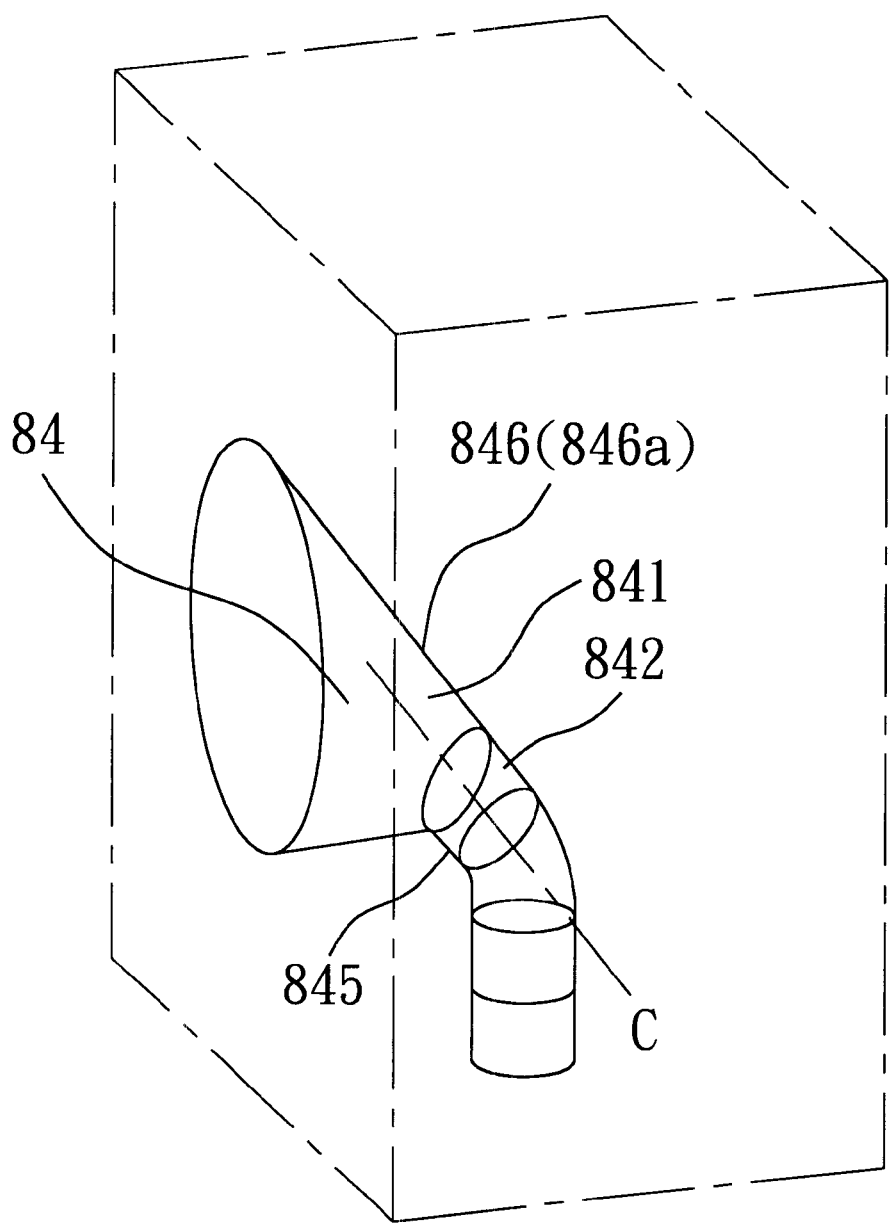
FIG. 7 is a fragmentary schematic perspective view illustrating the injection chamber unit of the second preferred embodiment.

Referring to FIGS. 5 and 6, in the second preferred embodiment of the injection molding machine of the present invention, like the transitioning passage 83 in the first embodiment, a transitioning passage 84 interconnects the horizontal channel 81 and the vertical channel 82 of an injection chamber unit 8', and has an innermost turning side 845 and an outermost turning side 846 longer than the innermost turning side 845. As with the previous embodiment, the transitioning passage 84 has first and second turning corners 843, 844 of obtuse angle at the outermost turning side 846. The transitioning passage 84 includes an asymmetric tapered passage section 841 which is connected to the horizontal channel 81, and a connecting passage section 842 which interconnects the tapered passage section 841 and the vertical channel 82. The tapered passage section 841 tapers toward the vertical channel 82. With further reference to FIG. 7, the tapered passage section 841 has an outer wall part 846a that partially confines the tapered passage section 841 at the outermost turning side 846. The outer wall part 846a has a shape conforming to a segment of a truncated cone-shape face that extends angularly by an angle of less than 360 degrees. The wall part 846a complements with the remaining wall part of the tapered passage section 841, which is shaped differently therefrom, so as to form an asymmetric confining wall. The connecting passage 842 is substantially cylindrical in shape, and has an axis (C) which is inclined with respect to the axis of the horizontal channel 81 and to the axis of the vertical channel 82.

It is found that, by virtue of the obtuse turning corners 837, 838, 843, 844, the liquid molding material is capable of flowing through the transitioning passage 83, 84 in a relatively smooth manner, thereby effectively preventing accumulation of the material at the transitioning passage 83,84 and thereby resulting in an enhanced quality of the resulting injection molded product.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An injection molding machine for injection molding a material, said injection molding machine comprising:
   a machine body;
   an injection chamber unit mounted on said machine body;
   a screw barrel mounted on said machine body and extending partially and movably into said injection chamber unit for reciprocating movement therein; and
   an extruding screw mounted inside said screw barrel, wherein said injection chamber unit has a horizontal channel for reciprocation of said screw barrel, a vertical channel having an injection nozzle, and a transitioning passage interconnecting said horizontal channel and said vertical channel, said transitioning passage having an innermost turning side and an opposite outermost turning side longer than said innermost turning side, said transitioning passage including at least two. turning corners of obtuse angle at said outermost turning side, one of said turning corners being disposed at the juncture of said horizontal channel and said transitioning passage, the other one of said turning corners being disposed at the juncture of said transitioning passage and said vertical channel, said transitioning passage further including an asymmetric tapered passage section which tapers toward said vertical channel and which has a wall part that partially confines said tapered passage section at said outermost turning side, said wall part having a shape conforming to a segment of a truncated cone-shaped face which complements a wall part of said asymmetric tapered passage section to form said asymmetric tapered passage section.

2. The injection molding machine according to claim 1, wherein said transitioning passage further includes a connecting passage which interconnects said tapered passage section and said vertical channel, said connecting passage having an axis which is inclined with respect to an axis of said horizontal channel and to an axis of said vertical channel.

3. The injection molding machine according to claim 1, wherein said transitioning passage further includes a symmetric truncated cone-shaped passage which interconnects said horizontal channel and said tapered passage section and which has an axis substantially coaxial with the axis of said horizontal channel.

* * * * *